June 17, 1952  J. KÖPFLI  2,600,885
STEERING GEAR FOR MOTOR VEHICLES
Filed July 23, 1949

INVENTOR.
JOSEF KÖPFLI.
BY K. B. Mayr.
ATTORNEY.

UNITED STATES PATENT OFFICE 2,600,885

STEERING GEAR FOR MOTOR VEHICLES

Josef Köpfli, Wil, Switzerland

Application July 23, 1949, Serial No. 106,368
In Switzerland August 3, 1948

3 Claims. (Cl. 280—96)

The present invention relates to a steering gear for motor vehicles especially for tractors and intends to provide an arrangement according to which, when the steering wheel is turned, of the two road wheels to be guided, the one that has to describe the inner circular arc is automatically displaced more than the other. In accordance with the invention, this aim is attained in that one wheel with its steering knuckle is connected to the steering column through bevel wheels of constant gear ratio, whilst the other wheel is connected to the same steering column through an operating element with an effective length varying according to the direction of steering.

Further features of the invention will appear from the claims, description and drawing, in which two forms of embodiment of the object of invention are illustrated.

Figure 1:
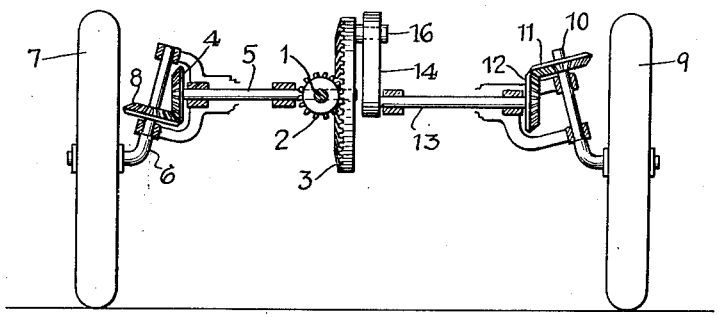
Fig. 1 is a diagrammatic representation of the steering gear according to the first form of embodiment.

Referring to said annexed drawing, numeral 1 designates the column of the steering wheel (not shown), the other end of the column carrying the bevel pinion 2. This bevel pinion meshes a bevel gear wheel 3, which in its turn is fixed to a shaft 5 carrying a bevel wheel 4 at its other end. The wheel 7 of the motor vehicle is attached to a steering knuckle 6 connected to the bevel wheel 4 via bevel wheel 8 arranged on said knuckle 6.

The other wheel 9 of the motor vehicle is, in a similar way to that described, attached to a steering knuckle 10 operatively connected via bevel wheels 11, 12 with a shaft 13 displaced with respect to the shaft 5 both vertically and laterally. Said shaft 13 carries at its other end an operating element 14 formed as crank arm and provided with a longitudinal slot 15. The operating element rotates in a plane parallel to the plane of the bevel gear wheel 3 and is driven by a bolt 16 of said wheel 3.

Figure 2:
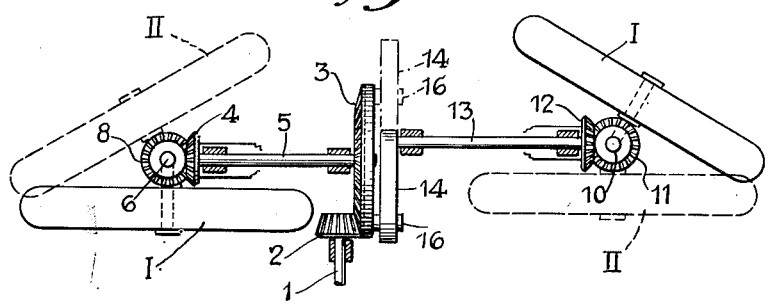
Fig. 2 is a top view of the steering gear according to Fig. 1, with different obliquities of the road wheels.
Figure 3:
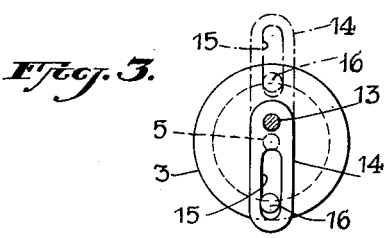
Fig. 3 is a side view of a detail of the steering mechanism according to the invention in a position corresponding to an extreme operating position of the dirigible wheels.

Upon turning the steering wheel and hence of the column 1, the motion is transmitted to the wheel 7 of the vehicle via bevel gear wheel 3, shaft 5, bevel-wheel pair 4, 8 and steering knuckle 6, the gear ratio between the turning of the column 1 and the movement of the wheel 7 remaining constant. On the other hand, upon turning the column 1, the operating element 14 is driven by the bolt 16. In consequence of the eccentricity of the two shafts 5 and 13, the bolt 16 is caused to move in the slot 15 of the operating element 14, so that the effective length of the latter, determined by the point of rotation of the element and the momentary point of application of bolt 16, alters in dependence on the direction of steering. This variation may be kept within predetermined limits by suitably displacing the shaft 13 with respect to shaft 5, a displacement which may be determined experimentally. In this way, depending on the direction of turning, the shaft 13 makes more or fewer rotations than the shaft 5, in other words the wheel 9 is displaced more or less than the wheel 7. Then, logically, the ratios must be chosen in such a way that the wheel that describes the inner circular arc is more displaced than the other road wheel. In the described manner the road wheels may be displaced within a very wide range, as may be seen from Fig. 2, where the two extreme positions I and II of the wheel are shown.

Figure 4:
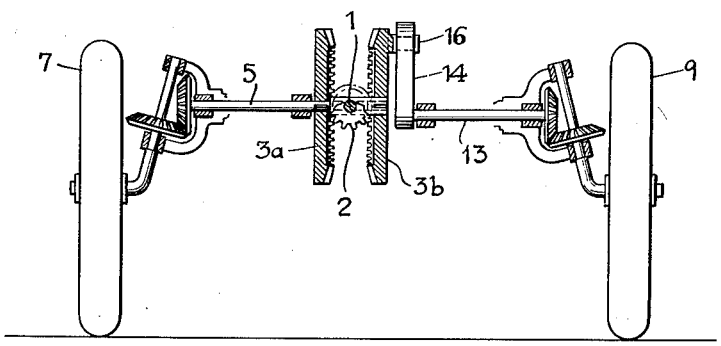
Fig. 4 shows a second form of embodiment incorporating the invention.

A form of embodiment, somewhat modified as compared with that just described, may be seen from Fig. 4. The difference consists in that, on shaft 5, a bevel gear wheel 3a is fixedly mounted and a further bevel gear wheel 3b rotatably mounted, the two bevel gear wheels 3a and 3b being moved by the bevel pinion 2 arranged on the steering column 1. The bevel gear wheel 3b, loosely mounted on shaft 5, is provided in the described manner with the bolt 16 which, coacting with the (operating) element 14, drives the shaft 13. This shaft again is arranged displaced both vertically and laterally with respect to the shaft 5.

The action of the described steering gear corresponds exactly to that according to the first form of embodiment.

Through the invention a widely experienced drawback of known types of steering gear is overcome, this being achieved by adopting a toothed-wheel gear instead of the hitherto usual rod steering. By this, full steering obliquity is rendered possible, without a dead centre occurring in the steering mechanism at any obliquity of the road wheels. With the orthodox design of rod steering, the steering gear often becomes locked at a total steering obliquity of 90°, since the links of the steering rods come into a dead centre.

What I claim is:
1. In a motor vehicle having two dirigible wheels: steering means comprising a steering shaft, a speed reducing gear having a high speed tooth wheel connected with and rotated by said shaft, a slow speed tooth wheel driven by said high speed wheel, connection means interconnecting said slow speed wheel and one of said dirigible wheels for changing its position in fixed relation to the speed and direction of rotation of said steering shaft, said connecting means comprising a drive shaft coaxially connected with and driven by said slow speed wheel; means for changing the position of the other of said dirigible wheels, said last mentioned means comprising a shaft disposed substantially parallel to and eccentrically of said drive shaft, a crank arm extending at a substantially right angle from said last mentioned shaft, and a pin extending from said slow speed wheel substantially parallel to its rotation axis and slidably engaging said crank arm for rotating said last mentioned shaft by said slow speed wheel at a speed which changes according to the direction and amount of rotation of said slow speed wheel.

2. In a motor vehicle as defined in claim 1, a bevel gear connected with said drive shaft and a bevel gear connected with the shaft which is eccentric of said drive shaft, said bevel gears being positioned on opposite sides and distal of said reducing gear and individually forming part of said means for changing the positions of said dirigible wheels.

3. In a motor vehicle having two dirigible wheels: steering means comprising a steering shaft, a speed reducing bevel gear having a pinion connected with and rotated by said shaft, a first bevel gear wheel driven by said pinion, connecting means interconnecting said first gear wheel and one of said dirigible wheels for changing its position in fixed relation to the speed and direction of rotation of said steering shaft, said connecting means comprising a drive shaft coaxially connected with and driven by said first gear wheel; a second bevel gear wheel driven by said pinion and coaxially rotatably connected with said first gear wheel; means for changing the position of the other of said dirigible wheels, said last mentioned means comprising a shaft disposed substantially parallel to and eccentrically of said drive shaft, a crank arm on said last mentioned shaft, and a pin extending axially from said second gear wheel and slidably engaging said crank arm for rotating said last mentioned shaft by said second gear wheel at a speed changing according to the direction and amount of rotation of said second gear wheel.

JOSEF KÖPFLI.

REFERENCES CITED

The following references are of record in the file of this patent:

UNITED STATES PATENTS

| Number | Name | Date |
|---|---|---|
| 606,311 | Sydenham | June 28, 1898 |
| 923,167 | Gray | June 1, 1909 |
| 1,047,238 | Kennedy | Dec. 17, 1912 |
| 1,113,431 | Groupe | Oct. 13, 1914 |
| 1,312,648 | Taussing | Aug. 12, 1919 |
| 1,476,068 | Froelich | Dec. 4, 1923 |

FOREIGN PATENTS

| Number | Country | Date |
|---|---|---|
| 131,967 | Great Britain | Sept. 5, 1919 |
| 630,501 | France | Dec. 5, 1927 |